United States Patent

[11] 3,602,989

[72] Inventor Marnie C. Averitt
 107 Westdale Court, Timonium, Md. 21093
[21] Appl. No. 862,802
[22] Filed Oct. 1, 1969
[45] Patented Sept. 7, 1971

[54] STORED ENERGY SHEAR DEVICE
 12 Claims, 7 Drawing Figs.
[52] U.S. Cl. ..................................................... 30/261
[51] Int. Cl. ....................................................... B26b 13/16
[50] Field of Search .......................................... 30/209, 249–252, 228, 261, 180, 187, 188, 190, 193, 212

[56] References Cited
 UNITED STATES PATENTS
 289,116  11/1883  McDonald ................. 30/249 X
 1,802,571  4/1931  Orussa ...................... 30/228
 2,916,823  12/1959  Mittanck ................... 30/228 X Primary Examiner—Robert C. Riordon
Assistant Examiner—J. C. Peters
Attorney—Joseph R. Slotnik ABSTRACT: A portable shear device comprising pivotally mounted blades normally biased toward a closed or cutting position. Handle means is provided to move the blades relative to one another toward an open position and is releasable whereupon the blades close and perform a cut.

PATENTED SEP 7 1971 3,602,989

INVENTOR
MARNIE C. AVERITT

BY Joseph R. Slotnik

ATTORNEY

INVENTOR
MARNIE C. AVERITT
BY Joseph R. Slotnik
ATTORNEY 3,602,989

STORED ENERGY SHEAR DEVICE

SUMMARY OF THE INVENTION

The present invention is directed to a novel shear device which employs stored energy in performing the cutting or shearing action. In an illustrative embodiment, the invention is depicted by a pair of pivotally mounted blades biased by resilient means toward a closed, cutting position. The blades are adapted to be manually pivoted toward an open position whereupon energy is stored in the resilient means. Thereafter, the blades are released and closed under the force of the stored energy in the resilient means.

Main objects of the present invention, therefore, are to provide a novel shear device which includes manually manipulatable blades and which employs stored energy to effect the cutting or shearing action.

Additional important objects of this invention are to provide a novel shear device of the above character which is relatively easy to operate and which embodies simplicity, reliability and efficiency.

Further important objects are to provide a novel shear device of the above character which is relatively inexpensive to manufacture, rugged in construction, and reliable in use.

Other objects and advantages of this invention will become more apparent from a consideration of the detailed description to follow taken in conjunction with the drawings annexed hereto.

BROAD STATEMENT OF THE INVENTION

Figure 1:
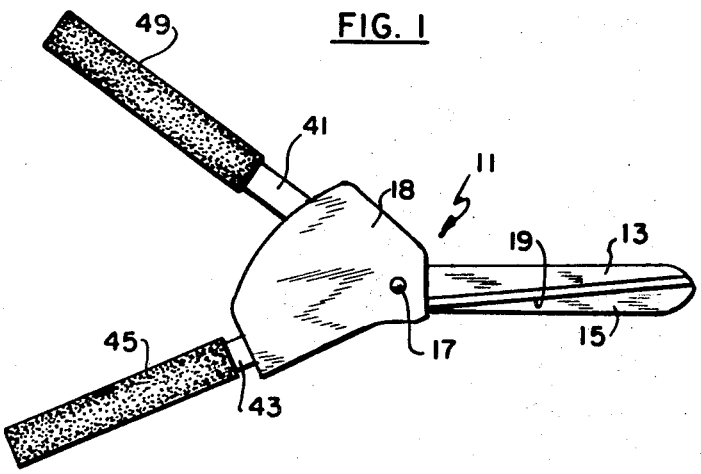
FIG. 1 is a plan view illustrating a portable shear embodying the present invention.

Broadly described, the present invention relates to a portable shear device comprising a pair of pivotally connected blades adapted for relative movement from a first open position to a second position where said blades cooperate to perform a cut on a workpiece, means normally biasing said blades toward said second position, a first handle rigid with a first one of said blades, a second handle pivoted to a second one of said blades, a latch on said second handle and engageable with means rigid with said second blade, said handles being movable from a first position to a second position, with said latch engaged with said rigid means, and operable to move said blades from said second to said first position against said biasing means, whereby to store energy in said biasing means, said latch being releasable from said rigid means in response to movement of said handles to said second position, whereby said blades move toward said second position under the force of stored energy in said biasing means.

In another aspect, the present invention relates to a portable shear device comprising a pair of pivotally connected blades adapted for relative movement from a first open position to a second position where said blades cooperate to perform a cut on a workpiece, means normally biasing said blades toward said second position, first and second pivotally interconnected handles, said first handle being rigid with said first blade, said second handle being pivoted to said second blade, said handles being operable to move said blade from said second to said first position against said biasing means, whereby to store energy in said biasing means, latch means interconnecting said second handle and said second blade and releasable in response to full movement of said blades to said first position, whereby said blades move toward said second position under the force of stored energy in said biasing means.

In still another aspect, the present invention relates to a portable shear device comprising a pair of pivotally connected blades adapted for relative movement from a first open position to a second position where said blades cooperate to perform a cut on a workpiece, means normally biasing said blades toward said second position, handle means including first and second handles rigid with and pivoted to respective ones of said blades and manually operable to move said blades from said second to said first position against said biasing means, whereby to store energy in said biasing means, latch means releasably interconnecting said pivoted handle and its associated blade, said latch means being releasable in response to movement of said blades to said first position, whereby said blades move toward said second position under the force of stored energy in said biasing means.

In still another aspect, the present invention relates to a portable shear device comprising a pair of pivotally connected blades adapted for relative movement from a first open position to a second position where said blades cooperate to perform a cut on a workpiece, a compression spring interposed between said blades and normally biasing said blades toward said second position, mounting means pivoted to one of said blades and preventing lateral deflection of said spring, handle means manually operable to move said blades from said second to said first position against said spring, whereby to store energy in said spring, said blades being releasable, in response to movement to said first position, whereby said blades move toward said second position under the force of stored energy in said compression spring.

In yet another aspect, the present invention relates to a portable shear device comprising a pair of blades relatively movable from a first open position to a second shearing position, spring means normally biasing said blades toward said second position, handle means including a first handle pivotally connected to one blade for conjoint movement therewith by a releasable latch, a second handle rigid with the other blade, said first handle being movable in a first direction relative to said second handle whereby to engage said latch, said first handle and said one blade being thereafter movable conjointly against said spring means in a second direction relative to said second handle, whereby to move said blades to said first position and store energy in said spring means, said releasable means being engageable with means rigid with said second handle and said other blade when said blades are in said first position to release said latch and said first handle from said one blade, whereby to release said blades for movement to said second position under the force of stored energy in said spring.

In yet another aspect, the present invention relates to a portable shear device comprising pivotally interconnected blades, first resilient means normally biasing said blades toward a closed shearing position, a pair of handles pivotable toward one another and engageable with said blades to pivot said blades relative to one another toward an open position, at least one of said handles being releasable from its associated blade when said blades are in said open position, whereby said blades move relative to one another to said closed shearing position, second resilient means normally biasing said handles away from one another, whereby said handles are operable in one hand fashion.

DETAILED DESCRIPTION

Figure 2:
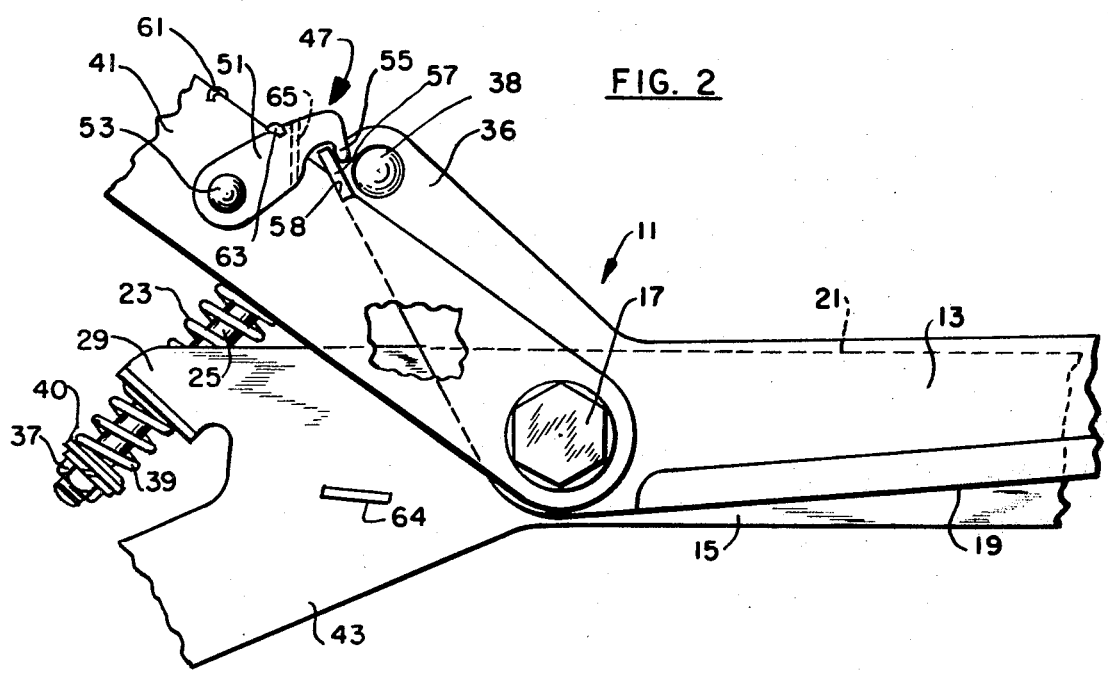
FIG. 2 is an enlarged view of a portion of FIG. 1 shown with parts removed for clarity and with the blades closed.
Figure 3:
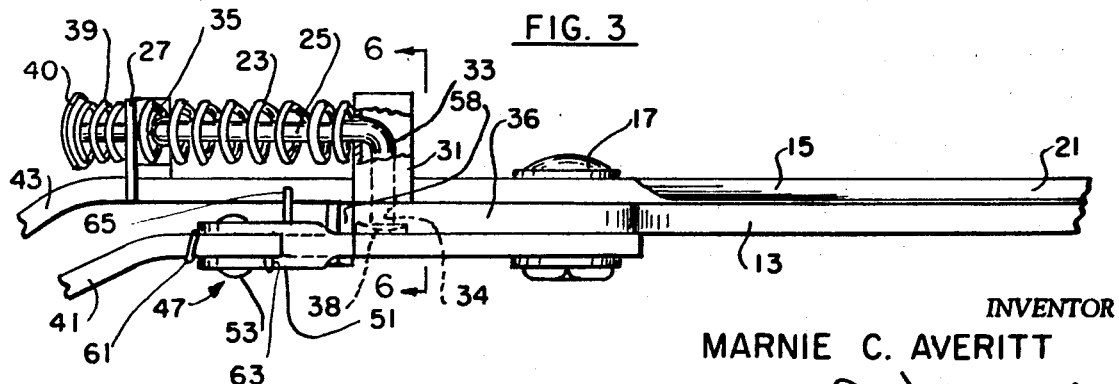
FIG. 3 is a side view of FIG. 2.

Referring now specifically to the drawings, a portable shear device embodying the present invention is illustrated generally at 11 in FIGS. 1 and 2 and is seen to include a pair of blades 13, 15 pivotally interconnected by a pivot bolt 17. The blades 13, 15 are enclosed by a housing 18 at the area of the pivot bolt and are provided with shearing edges 19, 21 which cooperate in scissorlike fashion.

The blades 13, 15 are normally biased toward a closed shearing position by a relatively heavy compression spring 23. As shown, the spring 23 is disposed on a spring bolt 25 and is caged between an upstanding tab 27, which may be formed integral with a rearward extension of the blade 15, and a floating, generally U-shaped connector 31 disposed on the spring bolt 25. This spring bolt 25 is generally L-shaped and has a short leg 33 bent generally transverse to its major portion against which the floating connector 31 bears.

The leg 33 extends pivotally through an opening 34 in a rearward extension 36 of the blade 13 and is restrained in place therein by an enlarged head thereon. The other end of the spring bolt 25 extends through an opening in the tang 27 and has a washer 40 and a locknut 37 thereon. A relatively short, shock-absorbing, compression spring 39 is caged between the tang 27 and the washer 40 for a purpose to be described.

Figure 5:
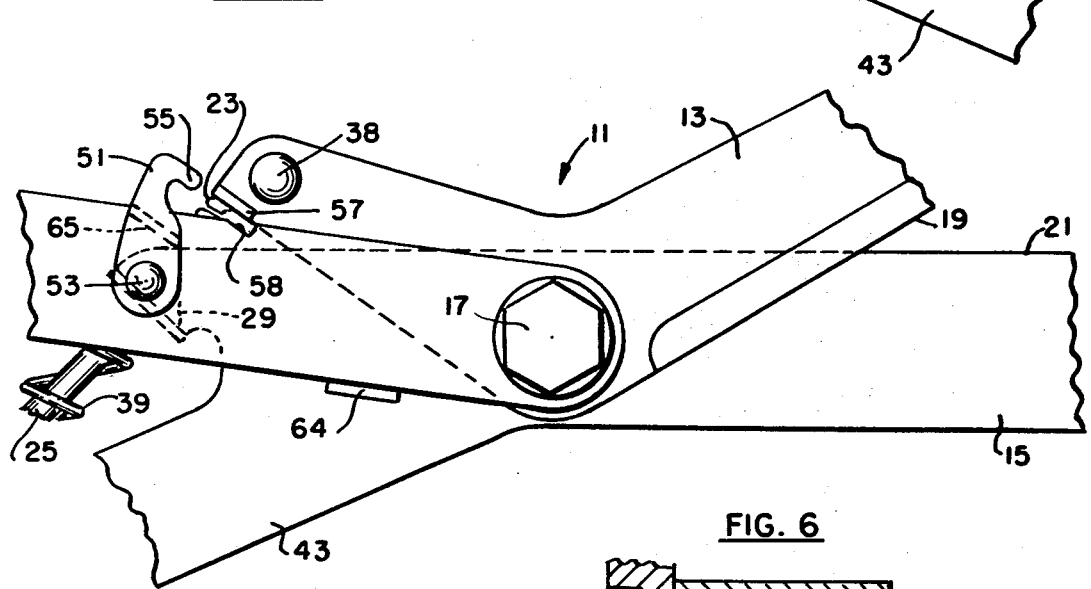
FIG. 5 is a view similar to FIG. 2 and showing the blades open and the latch released.
Figure 6:
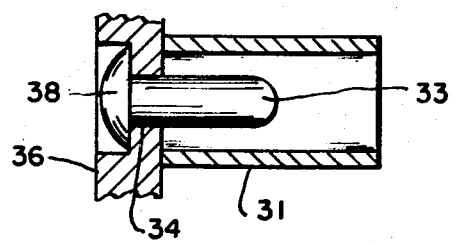
FIG. 6 is an enlarged sectional view of FIG. 3 taken along the line 6—6 thereof.

Thus, it will be appreciated that the spring 23 normally biases the blades 13, 15 toward the position shown in FIG. 2 and movement in this direction is limited by the length of the spring bolt 25. The blades 13, 15 are pivotable relative to one another about the axis of the pivot bolt 17 to an open position, illustrated in FIG. 5. In accordance with the present invention, the blades 13, 15 are releasable, in response to movement thereof to the open position, whereby the blades return to the closed shearing position under the force of the compression spring 23.

A pair of handles 41, 43 are provided to manipulate the blades 13, 15, respectively, and extend rearwardly therefrom. As shown, the handle 43 is rigid with the blade 15 and may be provided with a handle grip 45. The handle 41, however, is pivotally supported upon the pivot bolt 17 and is releasably interconnected with the blade 13 through a novel latch means 47. The handle 41 also may have a handle grip 49 thereon.

The latch means 47 is seen to include a bifurcated latch member 51 which embraces the handle 41 and is pivoted thereto at one end thereof by a pin 53. The latch member 51 has a hook 55 formed at its free end which is adapted to engage around an upstanding tab 57 formed integral with the blade extension 36. The handle 41 has a recess 58 to receive the tab 57 when the latch hook 55 and tab 57 are engaged.

Figure 4:
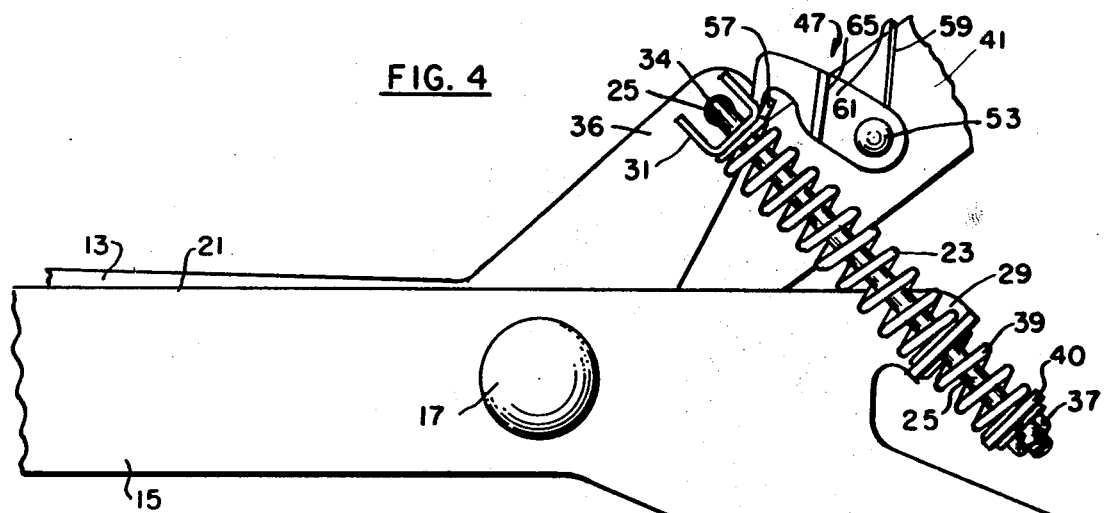
FIG. 4 is a bottom plan view of the structure of FIG. 2.

The latch member 51 is normally biased in a clockwise direction, as seen in FIG. 2, by a torsion spring 59 which is wrapped around the pivot pin 53 and has end tangs 61, 63 engaging the handle 41 and the latch member 51, respectively. A disengaging tab 65 on the latch member 51 engages the edge of the handle 41 and limits pivotal movement of the latch member 51 in this direction. However, the latch member 51 is pivotal about the pin 53 in a counterclockwise direction, as seen in FIG. 2, upon engagement of the dependent, disengaging tab 65, on the latch member 51, with the edge of the handle member 43. This occurs when the handles 41, 43 are moved toward one another from the position shown in FIG. 2 to the position shown in FIG. 5. This handle movement (with the latch hook 55 engaged about the tab 57) pivots the blades 13, 15 from the closed position to the open position. This moves the connector 31 toward the tab 27, with the spring bolt 25 pivoting about its short leg 33, thereby compressing the spring 23 and storing energy therein. At this point, the latch member disengaging tab 65 engages the edge of the handle 43 so that continued movement of the handles 41, 43 toward each other pivots the latch member 51 in a counterclockwise direction, as seen in FIG. 2, and in a clockwise direction, as seen in FIG. 4. This releases the latch hook 55 from the tab 57 on the blade extension 36 (FIG. 5) whereupon the blades 13, 15 are rapidly pivoted to the closed position under the force of energy stored in the loaded compression spring 23. The short compression spring 39 absorbs the shock which occurs when the blades reach the closed position and prevents stress in the spring bolt 25 and its associated parts, and prevents excessive shock from being felt by the operator. A dependent tab 64 on the handle 43 engages the handle 41 and limits pivotal movement of the latter toward the former when the latch 51 is released from the tab 57.

When it is desired to perform another cut, the handles 41, 43 are pivoted away from one another until the latch member 51, which has a cam surface 67 on the outer edge of the hook 55, engages and cams over the tab 57 on the handle 41. The torsion spring 59 insures that when the latch hook 55 passes the tab 57, the hook and tab are again engaged. Thereafter, pivotal movement of the handles 41, 43 toward one another repeats the cycle described above.

The portable shear device illustrated in FIGS. 1–6 will be recognized as a hedge or shrub clipper. It will be appreciated that prior art hedge clippers of this type require application of force manually by the operator to snap the blades closed and effect the shearing action. In contrast thereto, the present invention requires only that the user load or store energy in the spring 23 which, in turn, provides the shearing force. This is considerably easier on the operator and provides a better, more efficient shearing action.

Figure 7:
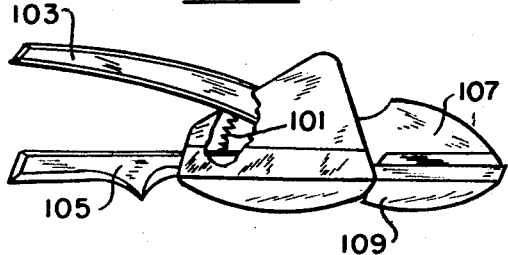
FIG. 7 is a plan view illustrating a modified form of the invention.

FIG. 7 illustrates a modified shear device embodying the principles of the present invention. This version is different from the form illustrated and described above in FIGS. 1–6 in that the FIG. 7 version is intended for one-hand operation. To this end, a compression spring 101 is interposed between handles 103, 105 to normally bias these handles apart after a cut has been performed by a pair of shearing blades 107, 109. This effects reengagement of a latch and a tab, similar in construction and arrangement to the latch 51 and tab 57 illustrated and described above for FIGS. 1–6, on the handle 103 and an extension of the blade 107, respectively. In all other respects, the construction and operation of the shear device of FIG. 7 is substantially the same as that shown in FIGS. 1–6 and described above.

While preferred embodiments of the present invention have been illustrated and described above in detail, various additions, substitutions, modifications, and omissions may be made thereto without departing from the spirit of the invention.

I claim:

1. A portable shear device comprising a pair of pivotally connected blades adapted for relative movement from a first open position to a second position where said blades cooperate to perform a cut on a workpiece, means normally biasing said blades toward said second position, a first handle rigid with a first one of said blades, a second handle pivoted to a second one of said blades, a latch on said second handle and engageable with means rigid with said second blade, said handles being movable from a first position to a second position, with said latch engaged with said rigid means, and operable to move said blades from said second to said first position against said biasing means, whereby to store energy in said biasing means, said latch being releasable from said rigid means in response to movement of said handles to said second position, whereby said blades move toward said second position under the force of stored energy in said biasing means.

2. A portable shear device comprising a pair of pivotally connected blades adapted for relative movement from a first open position to a second position where said blades cooperate to perform a cut on a workpiece, means normally biasing said blades toward said second position, first and second pivotally interconnected handles, said first handle being rigid with said first blade, said second handle being pivoted to said second blade, said handles being operable to move said blades from said second to said first position against said biasing means, whereby to store energy in said biasing means, latch means interconnecting said second handle and said second blade and releasable in response to full movement of said blades to said first position, whereby said blades move toward said second position under the force of stored energy in said biasing means.

3. A portable shear device comprising a pair of pivotally connected blades adapted for relative movement from a first open position to a second position where said blades cooperate to perform a cut on a workpiece, means normally biasing said blades toward said second position, handle means including first and second handles rigid with and pivoted to respective ones of said blades and manually operable to move said blades from said second to said first position against said biasing means, whereby to store energy in said biasing means, latch means releasably interconnecting said pivoted handle and its associated blade, said latch means being releasable in response to movement of said blades to said first position, whereby said blades move toward said second position under the force of stored energy in said biasing means.

4. A device as defined in claim 3 wherein said latch means includes a latch member pivoted on said pivoted handle and engageable with a rigid projection on said associated blade, means normally biasing said latch member in a direction causing interengagement with said rigid projection.

5. A device as defined in claim 3 wherein said latch means is engageable with said rigid handle to release said latch means when said blades are in said first position.

6. A portable shear device comprising a pair of pivotally connected blades adapted for relative movement from a first open position to a second position where said blades cooperate to perform a cut on a workpiece, a compression spring interposed between said blades and normally biasing said blades toward said second position, mounting means pivoted to one of said blades and preventing lateral deflection of said spring, handle means manually operable to move said blades from said second to said first position against said spring, whereby to store energy in said spring, said blades being releasable, in response to movement to said first position, whereby said blades move toward said second position under the force of stored energy in said compression spring.

7. A device as defined in claim 6, which includes a shock absorbing resilient member on said spring mounting means to absorb the force of the blow delivered by said compression spring.

8. A device as defined in claim 7 wherein said spring mounting means comprises an elongated member pivoted to one of said blades and slidably disposed relative to the other of said blades, said compression spring being interposed between means on said blades, said shock absorbing member comprising a compression spring caged between said other blade and said elongated member.

9. A portable shear device comprising a pair of blades relatively movable from a first open position to a second shearing position, spring means normally biasing said blades toward said second position, handle means including a first handle pivotally connected to one blade for conjoint movement therewith by a releasable latch, a second handle rigid with the other blade, said first handle being movable in a first direction relative to said second handle whereby to engage said latch, said first handle and said one blade being thereafter movable conjointly against said spring means in a second direction relative to said second handle, whereby to move said blades to said first position and store energy in said spring means, said releasable means being engageable with means rigid with said second handle and said other blade when said blades are in said first position to release said latch and said first handle from said one blade, whereby to release said blades for movement to said second position under the force of stored energy in said spring.

10. A device as defined in claim 9 which includes means normally biasing said latch toward interconnecting engagement with said first handle and said one blade.

11. A device as defined in claim 10 wherein said latch is pivoted on said first handle and has a hook engageable with means rigid with said one blade.

12. A portable shear device comprising pivotally interconnected blades, first resilient means normally biasing said blades toward a closed shearing position, a pair of handles pivotable toward one another and engageable with said blades to pivot said blades relative to one another toward an open position, at least one of said handles being releasable from its associated blade when said blades are in said open position, whereby said blades move relative to one another to said closed shearing position, second resilient means normally biasing said handles away from one another, whereby said handles are operable in one hand fashion.